United States Patent
Hirai et al.

(10) Patent No.: US 9,250,656 B2
(45) Date of Patent: Feb. 2, 2016

(54) COVER WINDOW FOR DISPLAY DEVICE, DISPLAY DEVICE INCLUDING THE SAME, AND METHOD FOR MANUFACTURING THE SAME

(71) Applicant: SAMSUNG DISPLAY CO., LTD., Yongin, Gyeonggi-Do (KR)

(72) Inventors: Akira Hirai, Yongin (KR); Kwan-Young Han, Yongin (KR); Hyoung-Suk Roh, Yongin (KR)

(73) Assignee: SAMSUNG DISPLAY CO., LTD., Yongin, Gyeonggi-do (KR)

( * ) Notice: Subject to any disclaimer, the term of this patent is extended or adjusted under 35 U.S.C. 154(b) by 12 days.

(21) Appl. No.: 14/056,299

(22) Filed: Oct. 17, 2013

(65) Prior Publication Data

US 2014/0285953 A1    Sep. 25, 2014

(30) Foreign Application Priority Data

Mar. 20, 2013  (KR) ......................... 10-2013-0029894

(51) Int. Cl.
| | |
|---|---|
| G02F 1/1333 | (2006.01) |
| G06F 1/16 | (2006.01) |
| H04M 1/02 | (2006.01) |
| H04M 1/18 | (2006.01) |

(52) U.S. Cl.
CPC ........... *G06F 1/1637* (2013.01); *H04M 1/0266* (2013.01); *H04M 1/185* (2013.01); *Y10T 29/49826* (2015.01)

(58) Field of Classification Search
CPC .............. G02F 1/133308; G02F 2001/133317; G06F 1/1637; Y10T 29/49826; H04M 1/0266; H04M 1/185
USPC ...................................................... 349/58–60
See application file for complete search history.

(56) References Cited

U.S. PATENT DOCUMENTS

| | | | |
|---|---|---|---|
| 2003/0210497 A1* | 11/2003 | Aoishi et al. .................. 360/133 |
| 2007/0222912 A1* | 9/2007 | Sato et al. ........................ 349/58 |
| 2010/0245707 A1* | 9/2010 | Harada ............. G02F 1/133308 349/58 |
| 2012/0162563 A1* | 6/2012 | Lai et al. .......................... 349/58 |
| 2012/0249940 A1* | 10/2012 | Choi et al. ...................... 349/123 |
| 2013/0021280 A1* | 1/2013 | Dabov et al. .................. 345/173 |

FOREIGN PATENT DOCUMENTS

| | | |
|---|---|---|
| KR | 10-2010-0138824 A | 12/2010 |
| KR | 10-2012-0067966 A | 6/2012 |

* cited by examiner

*Primary Examiner* — Charles Chang
(74) *Attorney, Agent, or Firm* — Lee & Morse, P.C.

(57) ABSTRACT

A cover window for a display device includes a display area and a non-display area, the cover window including a frame member disposed corresponding to the non-display area, and a protective member disposed on the frame member corresponding to the display area and the non-display area.

19 Claims, 10 Drawing Sheets

COVER WINDOW FOR DISPLAY DEVICE, DISPLAY DEVICE INCLUDING THE SAME, AND METHOD FOR MANUFACTURING THE SAME

CROSS-REFERENCE TO RELATED APPLICATION

Korean Patent Application No. 10-2013-0029894, filed on Mar. 20, 2013, in the Korean Intellectual Property Office, and entitled: "COVER WINDOW FOR DISPLAY DEVICE, DISPLAY DEVICE INCLUDING THE SAME, AND METHOD FOR MANUFACTURING THE SAME," is incorporated by reference herein in its entirety.

BACKGROUND

1. Field

Embodiments relate to a cover window for a display device, a display device including the same, and a method of manufacturing the cover window for the display device.

2. Description of the Related Art

A liquid crystal display (LCD) or an organic light emitting diode (OLED) display may be applied as display device to various mobile devices such as portable phones, navigation devices, digital cameras, electronic books, portable game machines, or various terminals.

The above information disclosed in this Background section is only for enhancement of understanding of the background of the invention and therefore it may contain information that does not form the prior art that is already known in this country to a person of ordinary skill in the art.

SUMMARY

Embodiments are directed to a cover window for a display device that includes a display area and a non-display area, the cover window including a frame member disposed corresponding to the non-display area, and a protective member disposed on the frame member corresponding to the display area and the non-display area.

The frame member may include an inorganic material and may be made of an opaque material, and the protective member may be made of a transparent material.

A thermal expansion coefficient of the frame member may be less than a thermal expansion coefficient of the protective member.

The frame member may include one or more of an inorganic metal, a metal alloy, a ceramic material, a carbon fiber, or a glass fiber.

The frame member and the protective member may be formed in a single layer or a multi-layer.

The protective member may include a first protective member disposed on a same layer with the frame member, the first protective member corresponding to the display area, and a second protective member disposed on the first protective member and the frame member.

The first protective member may be made of a transparent resin, and the second protective member may be made of a silsesquioxane.

The cover window may further include a light blocking member between the frame member and the protective member, the light blocking member corresponding to the non-display area.

The cover window may further include an opening formed in the frame member and the protective member through a region corresponding to at least a part of the non-display area.

At least a part of the frame member and at least a part of the protective member may be bent.

The cover window may have a thickness less than about 100 µm.

The cover window may further include a fixed member protruding from an edge of the frame member, and a hole may be formed in a central portion of the fixed member.

The cover window may further include an auxiliary fixed member protruding from an edge of the protective member, and a hole may be formed in a central portion of the auxiliary fixed member.

The frame member and the protective member may be bent at a plurality of points, and auxiliary fixed members may be disposed at the plurality of bent points, respectively.

The cover window may further include a light blocking member disposed between the frame member and the protective member, the light blocking member corresponding to the non-display area, and a groove may be formed in at least a part of a top surface or a bottom surface of the light blocking member, the groove being formed in a region where the frame member and the protective member are bent.

The frame member and the protective member may be bent at a plurality of points, and the grooves may be formed at the plurality of bent points, respectively.

The cover window may further include a groove formed in at least a part of a top surface of the frame member, the groove being formed in a region where the frame member and the protective member are bent, and a light blocking member disposed between the frame member and the protective member to cover the groove.

Embodiments are also directed to a display device, including a display panel including a display area and a non-display area, a frame member disposed on the display panel, the frame member including an opaque material, and corresponding to the non-display area, and a protective member disposed on the frame member, the protective member including a transparent material, and corresponding to the display area and the non-display area.

Embodiments are also directed to a method of manufacturing a cover window for a display device that includes a display area and a non-display area, the method including disposing a frame member corresponding to the non-display area, disposing a first protective member by coating a transparent resin on the frame member, and disposing a second protective member on the first protective member using a silsesquioxane.

The disposing of the first protective member and the disposing of the second protective member may be performed at a temperature greater than a room temperature or at a temperature greater than a use temperature range of the display device, and the method may further include cooling the cover window after disposing the second protective member.

BRIEF DESCRIPTION OF THE DRAWINGS

Features will become apparent to those of skill in the art by describing in detail example embodiments with reference to the attached drawings in which.

DETAILED DESCRIPTION

Figure 1:
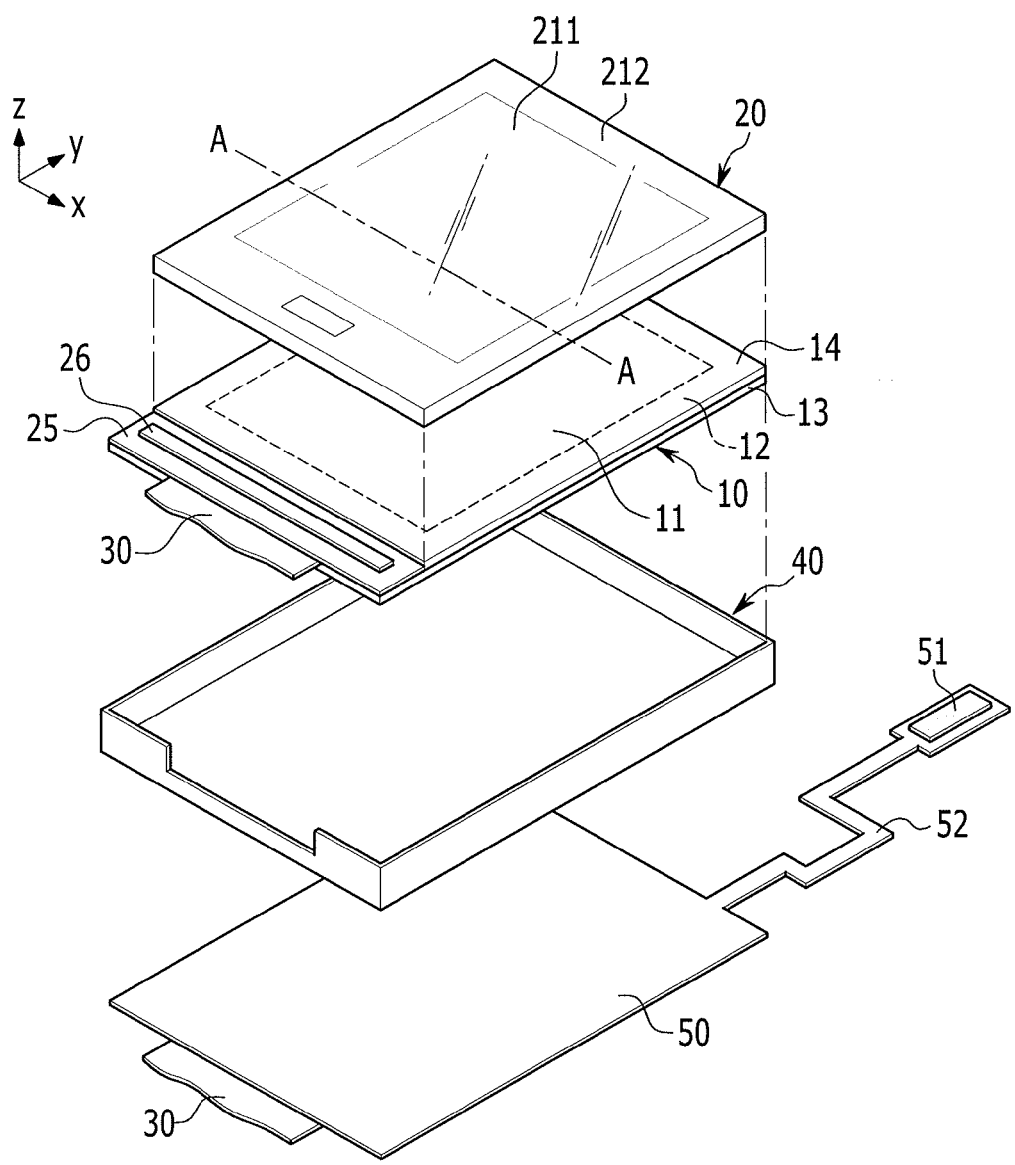
FIG. 1 illustrates an exploded perspective view of a display device according to a first example embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey example implementations to those skilled in the art. In the drawing figures, the dimensions of layers and regions may be exaggerated for clarity of illustration. Like reference numerals refer to like elements throughout.

In the following detailed description, the present invention will be described more fully hereinafter with reference to the accompanying drawings, in which example embodiments of the invention are shown. As those skilled in the art would realize, the described embodiments may be modified in various different ways, all without departing from the spirit or scope.

It will be understood that when an element such as a layer, film, region, or substrate is referred to as being "on" another element, it can be directly on the other element or intervening elements may also be present. In contrast, when an element is referred to as being "directly on" another element, there are no intervening elements present.

First, the display device according to the first example embodiment will be described with reference to FIG. 1.

FIG. 1 illustrates an exploded perspective view of a display device according to a first example embodiment.

Referring to FIG. 1, the display device 100 according to the first example embodiment includes a display panel 10 to display an image, a housing 40 receiving the display panel 10 and various components, and a cover window 20 disposed in a forward direction of the display panel 10 to protect the display panel 10.

The display panel 10 may include, e.g., an organic light emitting display panel or another display panel such as a liquid crystal display panel. The present example embodiment will be made on the assumption that the display panel 10 is the organic light emitting display panel for better understanding and ease of description.

The display panel 10 may be electrically connected to a printed circuit board through a flexible printed circuit (FPC) 50.

Pixels being a base unit of image expression may be arranged on a first substrate 13 of the display panel 10 in a matrix pattern, and the second substrate 14 may be bonded with the first substrate 13 through a sealing member (not shown) to protect the pixels. The first substrate 13 may be a rear substrate, and the second substrate 14 may be a front substrate.

For example, a pixel of an active matrix type organic light emitting display panel includes an organic light emitting diode (not shown) composed of an anode, an organic emission layer, and a cathode, and a driving circuit (not shown) driving the organic light emitting diode. The driving circuit may include a thin film transistor. A data line is connected to a source terminal of the thin film transistor, and a gate line is connected to a gate terminal of the thin film transistor. Further, one of an anode and a cathode of the organic light emitting diode is connected to a drain terminal of the thin film transistor.

The data line and the gate line are connected to the flexible printed circuit (FPC) 50 through a flexible printed circuit 30. If an electrical signal is input to the source terminal and the gate terminal of the thin film transistor through a flexible printed circuit (FPC) 50, the thin film transistor is turned-on or turned-off according to the input electrical signal to output an electrical signal necessary to drive the pixel to the drain terminal.

An integrated circuit chip 26 may be mounted on the first substrate 13 to control the display panel 10. The integrated circuit chip 26 generates timing signals to apply a data driving signal and a gate driving signal at a suitable time. Further, the integrated circuit chip 26 applies the timing signals to the data line and the gate line of the display panel 10. A protective layer 25 may be formed around the integrated circuit chip 26 to protect the integrated circuit chip 26.

Electronic devices (not shown) for processing the driving signals may be mounted on the flexible printed circuit (FPC) 50. The flexible printed circuit (FPC) 50 may include a connector 51 and an extension unit 52, and the extension unit 52 may be installed at an end of the connector 51 and may transmit an external signal to the flexible printed circuit (FPC) 50.

In the present example embodiment, the cover window 20 protecting the display panel 10 is placed in a forward direction of the display panel 10. The cover window 20 serves to protect the display panel 10 so as not to be damaged due to external impact. The cover window 20 may be adhered to the display panel 10 by a predetermined adhesive layer (not shown). In addition, the display panel 10 may be spaced apart from the cover window 20 while an air layer is interposed therebetween.

The cover window 20 may include a transparent unit 211 transparently provided at a region corresponding to a display area 11 of the display panel 10 so that the display area 11 may be viewed from the outside, and an opaque unit 212 opaquely provided at a region corresponding to a non-display area 12 of the display panel 10 so that the non-display area 12 is prevented from being viewed from the outside. The opaque unit 212 may serve to shield a wire or a component provided in the non-display area 12 of the display panel 10 so that the wire or the component is not viewed from the outside. The opaque unit 212 may include logos or decorative patterns of a product.

Hereinafter, additional aspects of the cover window for a display device according to the first example embodiment will be described with reference to FIGS. 2 and 3.

Figure 2:
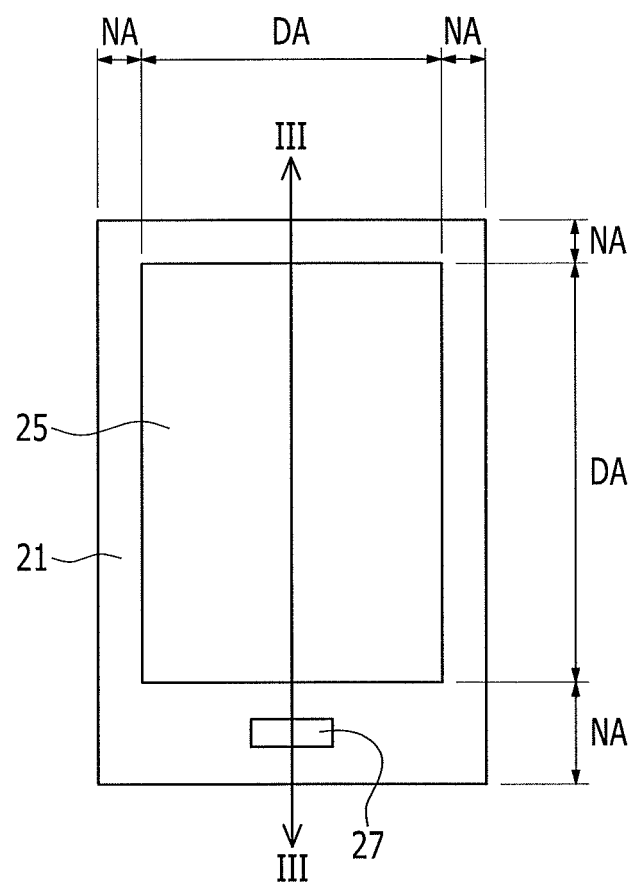
FIG. 2 illustrates a plan view of a cover window for the display device according to the first example embodiment.
Figure 3:
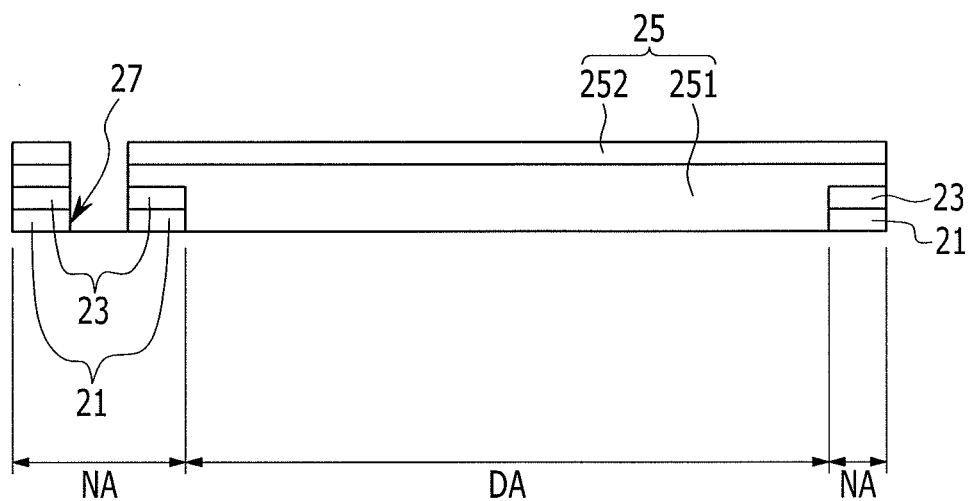
FIG. 3 illustrates a cross-sectional view of the cover window for the display device according to the first example embodiment taken along line III-III of FIG. 2.

FIG. 2 illustrates a plan view of the cover window for the display device according to the first example embodiment, and FIG. 3 illustrates a cross-sectional view of the cover window for the display device according to the first example embodiment taken along line III-III of FIG. 2.

As shown in FIGS. 2 and 3, the cover window 20 may include a frame member 21 disposed corresponding to a non-display area NA and a protective member 25 formed on the frame member 21 corresponding to the display area DA and the non-display area NA. The non-display area NA may have a shape that surrounds the display area DA.

The frame member 21 may include an inorganic material, and may be made of an opaque material. The protective member 25 may be made of a transparent material. The frame member 21 may be disposed at only the non-display area NA. Thus, the non-display area NA may be opaque and the display area DA may be transparent.

The frame member 21 may be made of a material having a thermal expansion coefficient less than a thermal expansion coefficient of the protective member 25. The thermal expansion coefficient of the frame member 21 may be less than the thermal expansion coefficient of the protective member 25. Thus, tension may be generated between the frame member 21 and the protective member 25, such that a top surface of the cover window 20 may be planarized.

The frame member 21 may include one or more of, e.g., an inorganic metal, a metal alloy, a ceramic material, a carbon fiber, or a glass fiber. The metal may include, e.g., iron (Fe), copper (Cu), nickel (Ni), aluminum (Al), titanium (Ti), an alloy thereof, a magnesium alloy, etc., and may be used for a window having a fixed shape or a flexible window. For example, the metal may be, e.g., as Invar (an alloy of Fe and Ni) or Super Invar (an alloy of Fe, Ni, and cobalt (Co)). Further, a carbon fiber reinforcing resin, a glass fiber reinforcing resin, a ceramic material, or the like may be suited to the window having fixed shape. The frame member 21 may be formed in a single layer or a multi-layer.

If tension due to a difference in thermal expansion coefficients between the frame member 21 and the protective member 25 is too great, bending may occur. In order to prevent such a phenomenon, elastic material having high Young's modulus and high bending flexibility may be used, and a reinforcing rib may be used for the frame member 21.

The following Table 1 lists properties of various materials.

TABLE 1

| Material name | Specific gravity | Young's modulus (GPa) | Young's modulus/ specific gravity | Bending elastic rate (GPa) | CTE (ppm/ °C.) |
|---|---|---|---|---|---|
| Glass | 2.5 | 65-90 | 26-36 | 70-90 | 8 |
| Titanium (Ti) | 4.51 | 106 | 23 | | 8.4 |
| Aluminum alloy A2017 | 2.70 | 69 | 26 | | 23 |
| Mg alloy AZ91 | 1.80 | 44 | 24 | 35 | 27 |
| Mg alloy (CF reinforcing AZ91) | 2.03 | 539 | 265 | 90 | 3 |
| CF reinforcing resin | 1.53 | 117 | 77 | 98 | 1.7/5.8 |
| CF reinforcing resin B | 1.53 | 225 | 147 | 260 | 0/9.0 |

TABLE 1-continued

| Material name | Specific gravity | Young's modulus (GPa) | Young's modulus/ specific gravity | Bending elastic rate (GPa) | CTE (ppm/ °C.) |
|---|---|---|---|---|---|
| Ceramic (Si—Al—Mg based) | 2.52 | 67 | 26 | | 9 |
| SUS304 | 7.90 | 199 | 25 | | 17.3 |
| PMMA | 1.19 | 3.14 | 3 | 3 | 80 |

As illustrated in the table 1, there are a plurality of materials having a bending elastic rate equal to or greater than a bending elastic rate of a glass. Meanwhile, materials lighter than the glass may be selected. Particularly, a carbon fiber (CF) reinforcing material may exhibit excellent properties.

The protective member 25 may be formed in a single layer or a multi-layer. For example, referring to FIG. 3, the protective member 25 may include a first protective member 251, which may be aligned on the same layer with the frame member 21 corresponding to the display area DA, and a second protective member 252, which may be disposed on the first protective member 251 and the frame member 21. In an implementation, the first protective member 251 may be made of a transparent resin, and the second protective member 252 may be made of a silsesquioxane.

A light blocking member 23 may be further disposed between the frame member 21 and the protective member 25. The light blocking member 23 may be disposed corresponding to the non-display area (NA). The frame member 21 may be made of an opaque material and the light blocking member 23 may be omitted. The light blocking member 23 may have the same pattern as a pattern of the frame member 21 or may have a pattern different from a pattern of the frame member 21. For example, the light blocking member 23 may have a pattern representing logos such as letters or pictures, and may have various colors.

An opening 27 may be formed in the frame member 21 and the protective member 25 through a region corresponding to at least a part of the non-display area NA. Although it is illustrated in the drawing that the opening 27 has a rectangular shape, the opening 27 may have various shapes, and the number of the openings 27 may be variously changed. For example, at least one button may be provided on the display panel 10 of FIG. 1, and an opening 27 may be formed in the cover window 20 corresponding to the at least one button.

Hereinafter, a method of manufacturing the cover window 20 of the display device according to the first example embodiment will be described with reference to FIGS. 4 to 6.

Figure 4:
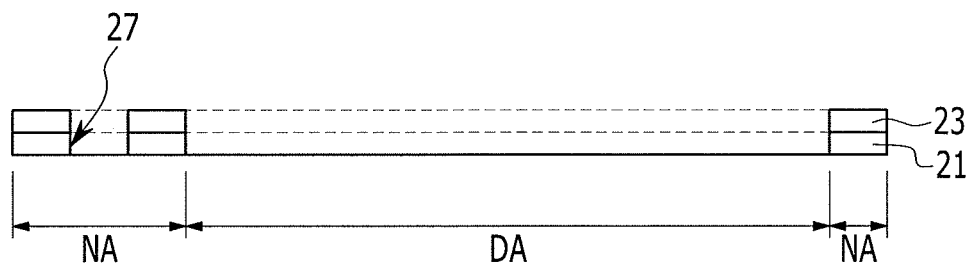
FIGS. 4 to 6 illustrate cross-sectional views of stages in a method of manufacturing the cover window for the display device according to the first example embodiment.
Figure 5:
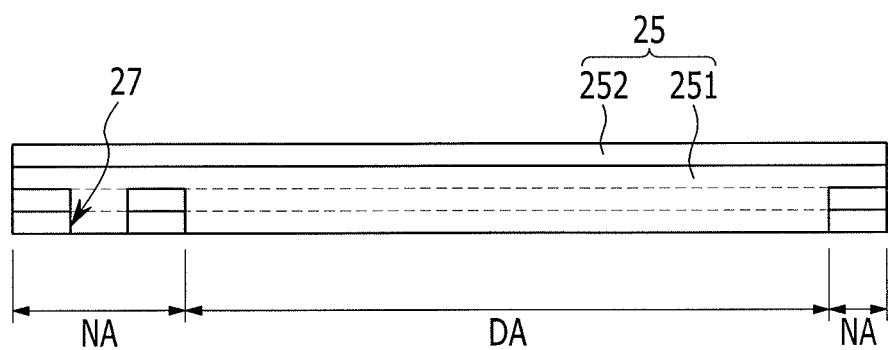
Figure 6:
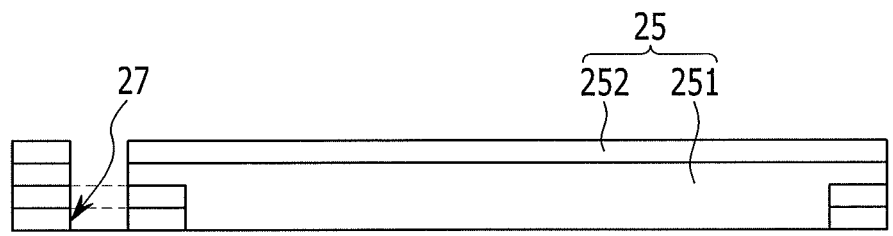

FIGS. 4 to 6 illustrate cross-sectional views of a method of manufacturing the cover window for the display device according to the first example embodiment.

First, as shown in FIG. 4, the frame member 21 may be disposed corresponding to the non-display area NA. Further, the opening 27 may be formed in a region of the frame member 21 corresponding to at least a part of the non-display area NA.

The frame member 21 may be made of, e.g., an inorganic metal, a metal alloy, a ceramic material, a carbon fiber, a glass fiber, etc.

Next, the light blocking member 23 may be disposed on the frame member 21 using, e.g., a resin material of black or various colors. The light blocking member 23 may have the same pattern as a pattern of the frame member 21 or may have a pattern representing logos such as letters or pictures. The frame member 21 may be made of an opaque material to prevent light from being leaked in the non-display area NA, and the light blocking member 23 may be omitted.

As shown in FIG. 5, a transparent resin may be coated on the light blocking member 23 to form the first protective member 251. The first protective member 251 may be disposed on the same layer with the frame member 21 corresponding to a display area DA. Further, the first protective member 251 may cover a top surface of the light blocking member 23.

Next, the second protective member 252 may be disposed on the first protective member 251, e.g., by applying a silsesquioxane. The second protective member 252 may be disposed corresponding to the display area DA and the non-display area NA.

The first protective member 251 and the second protective member 252 may be applied at a temperature greater than a room temperature or at a temperature greater than a temperature range of the display device.

In the present example embodiment, the first protective member 251 and the second protective member 252 are stacked to configure the protective member 25, although the protective member 25 may be formed in, e.g., a single layer, or in a multi-layer having three or more layers.

As shown in FIG. 6, the first protective member 251 and the second protective member 252 formed inside the opening 27 may be cut and removed, e.g., using a laser processor. When the first protective member 251 and the second protective member 252 are disposed at an outer peripheral portion of the frame member 21, the first protective member 251 and the second protective member 252 may be simultaneously cut and removed based on the non-display area NA.

Next, although not shown, a surface of the protective member 25 may be hard coated, anti-reflection (AR) coated, or anti-fouling (AF) processed.

After that, the cover window 20 may be cooled to a room temperature. Tension may be generated between the frame member 21 and the protective member 25 due to a difference in thermal expansion coefficients between the frame member 21 and the protective member 25. For example, the frame member 21 may be made of a Super Invar. After the protective member 25 is formed, e.g., using a material of thermal expansion coefficient of 100 ppm/° C., e.g., at a temperature of 125° C., the protective member 25 may be cooled to the room temperature. In this case, the tension may be generated between the frame member 21 and the protective member 25 to planarize the protective member 25.

A cover window of a display device according to the second example embodiment will be described with reference to FIGS. 7 and 8.

Figure 7:
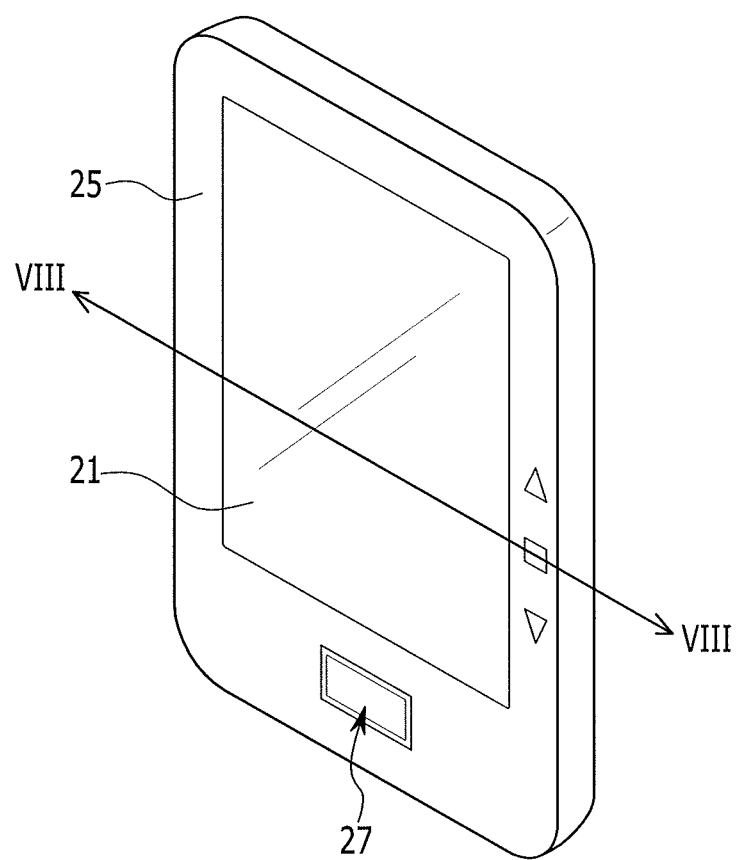
FIG. 7 illustrates a plan view of a cover window for a display device according to the second example embodiment.
Figure 8:
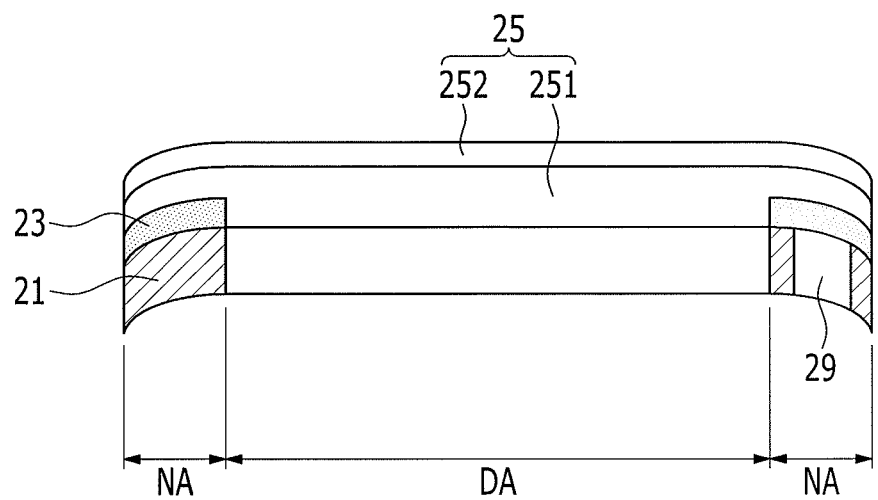
FIG. 8 illustrates a cross-sectional view of the cover window for a display device according to the second example embodiment taken along line VIII-VIII of FIG. 7.

FIG. 7 illustrates a plan view of a cover window for a display device according to the second example embodiment, and FIG. 8 illustrates a cross-sectional view of the cover window for a display device according to the second example embodiment taken along line VIII-VIII of FIG. 7.

The cover window for a display device according to the second example embodiment is substantially the same as the cover window of a display device according to the first example embodiment, and thus a repetition of the description about the same parts will be omitted and only different parts will be described. In the present example embodiment, the cover window does not have a flat shape but has a bent shape, which will be described in detail below.

As shown in FIGS. 7 and 8, the cover window 20 for a display device according to the second example embodiment may include a frame member 21 disposed corresponding to the non-display area NA, and a protective member 25 disposed on the frame member 21 corresponding to the display area DA and the non-display area NA.

In the present example embodiment, left and right edges of the cover window 20 may be bent downward from the non-display area NA. Both edges of the frame member 21 may be bent, and both edges of a light blocking member 23 and the protective member 25 may be bent according to a bent shape of the frame member 21.

In order to form the cover window 20 having a three-dimensional structure, after shapes of both edges of the frame member 21 are bent, the protective member 25 may be molded and stacked by a heating press. After the frame member 21 is planarized, molding by a heating press may be performed while disposing the protective member 25.

In order to reinforce bending strength, a rib may be formed at the frame member 21 in advance. Moreover, an in-mold may be performed using a press molding window.

An opening 29 may be further formed in the cover window 20 corresponding to at least a part of the non-display area NA. An indicator may be provided on the display panel 10 of FIG. 1 corresponding to a formation region of the opening 29.

Hereinafter, a cover window 20 for a display device according to the third example embodiment will be explained with reference to FIG. 9.

Figure 9:
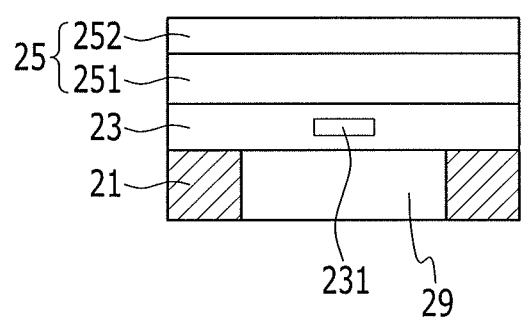
FIG. 9 illustrates a cross-sectional view of a cover window for a display device according to the third example embodiment.

FIG. 9 is a cross-sectional view illustrating a cover window for a display device according to the third example embodiment.

The cover window for a display device according to the third example embodiment may be substantially the same as the cover window of a display device according to the second example embodiment. Thus, a repetition in the description about the same parts will be omitted and only different parts will be described.

In the cover window for a display device according to the third example embodiment, an opening 29 is formed, e.g., corresponding to an indicator of a display panel, and a light blocking member 23 covers an upper portion of the opening 29.

In the present example embodiment, a space 231 is formed in the light blocking member 23 inside a partial region above the opening 29. The light blocking member 23 may include a region corresponding to the partial region above the opening 29 which has a thickness less than those of other regions.

Hereinafter, the cover window 20 for a display device according to the fourth example embodiment will be described with reference to FIG. 10.

Figure 10:
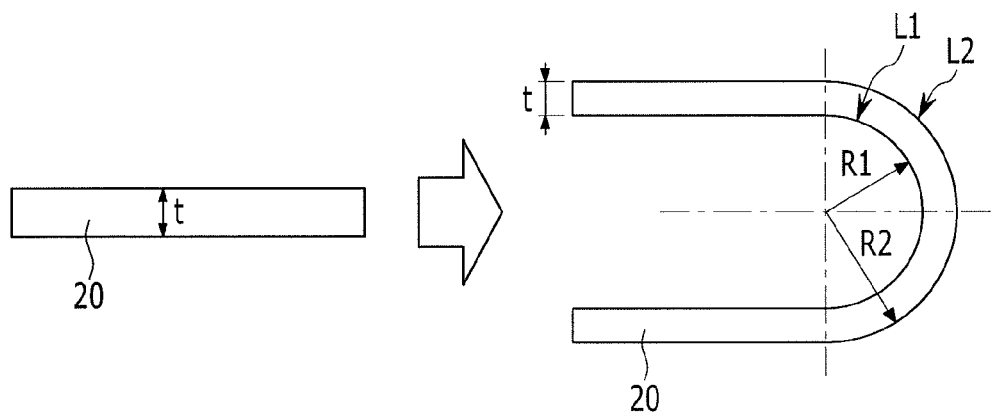
FIG. 10 illustrates a cross-sectional view of the cover window for a display device before and after bending the cover window according to the fourth example embodiment.

FIG. 10 is a cross-sectional view illustrating the cover window for the display device before and after bending the cover window according to the fourth example embodiment.

The cover window for a display device according to the fourth example embodiment is made of a flexible or foldable material.

As shown in FIG. 10, as a cover window 20 having thickness t is bent at a radius R1, an inner side of the cover window 20 is compressed and an outer side thereof is drawn so that stress is applied to the cover window 20. However, an elastic member such as rubber is elastically deformed due to compression stress. Meanwhile, a change in a material having high Young's modulus by drawing stress is greater than a change in the above material by compression stress.

A length $\Delta L$ elongated by drawing may be expressed by a following equation 1.

$$\Delta L = L2 - L1 = \pi(R2 - R1) \qquad \text{[Equation 1]}$$

Assuming that compression change does not occur according to bending, the ΔL becomes π t so that an elongation rate may be expressed by a following equation 2.

$$(\Delta L/L2) = t/R2 \quad \text{[Equation 2]}$$

Accordingly, in order to reduce the elongation rate, it is necessary to reduce a thickness t of the cover window 20, and to increase a bending radius R2.

Table 2 illustrates relationship between a thickness of a film and a bending radius. For example, when the bending radius is 2.5 mm, the elongation rate has 1.0% at a thickness 25 μm of the film.

TABLE 2

| Film thickness | R2 = 2.5 mm | | R2 = 5 mm | | R2 = 10 mm | |
|---|---|---|---|---|---|---|
| | ΔL | Increase rate | ΔL | Increase rate | ΔL | Increase rate |
| 25 μm | 78.5 μm | 1.0% | 78.5 μm | 0.5% | 78.5 μm | 0.25% |
| 50 μm | 157 μm | 2.0% | 157 μm | 1.0% | 157 μm | 0.5% |
| 100 μm | 314 μm | 4.0% | 314 μm | 2.0% | 314 μm | 1.0% |

As described in the equations 1 and 2 and the Table 2, it is preferable to make a thickness of the cover widow 20 thin to be applied to the flexible display device. For instance, the thickness of the cover window 20 may have a thickness 100 μm or less.

Hereinafter, the cover window for a display device according to the fifth example embodiment will be described with reference to FIGS. 11 to 13.

Figure 11:
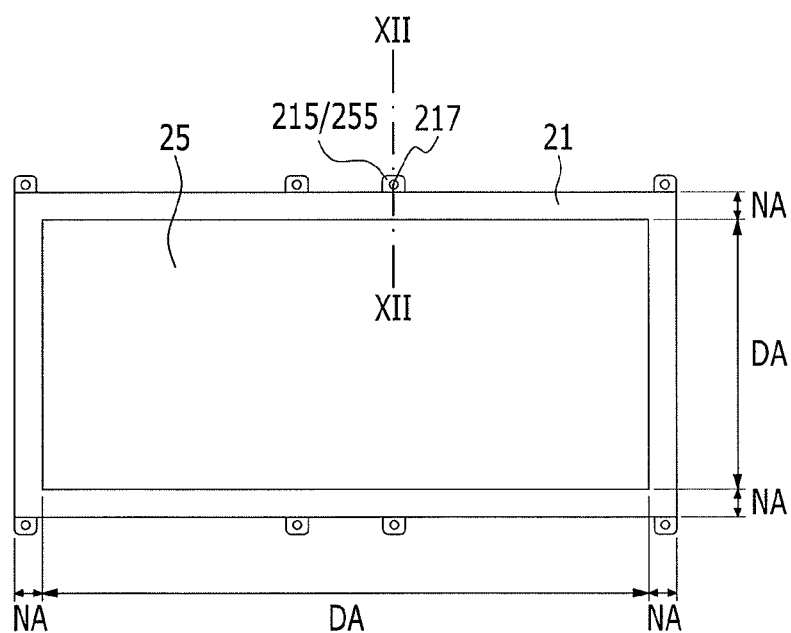
FIG. 11 illustrates a plan view of a cover window for a display device according to the fifth example embodiment.
Figure 12:
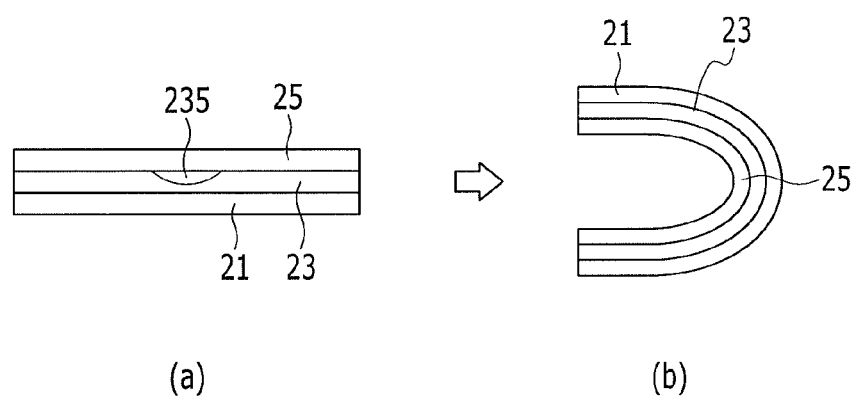
FIGS. 12 and 13 illustrate cross-sectional views of the cover window for a display device according to the fifth example embodiment taken along line XII-XII of FIG. 11.
Figure 13:
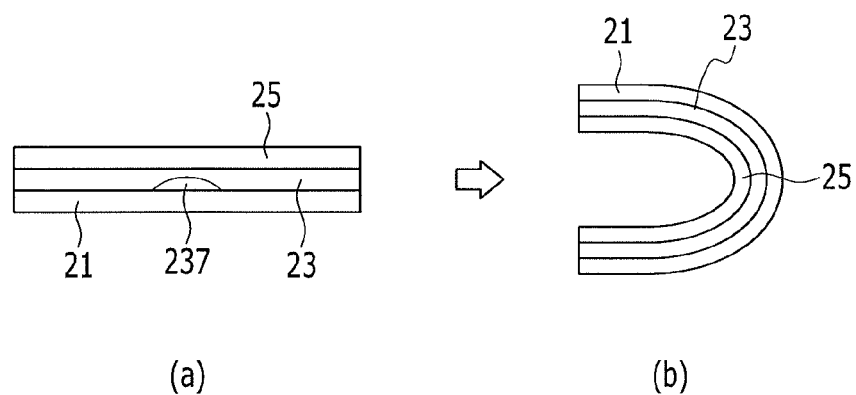

FIG. 11 is a plan view illustrating the cover window for the display device according to the fifth example embodiment, and FIGS. 12 and 13 are cross-sectional views of the cover window for a display device according to the fifth example embodiment taken along line XII-XII of FIG. 11.

The cover window for a display device according to the fifth example embodiment is made of a flexible or foldable material.

As shown in FIGS. 11 and 12, the cover window 20 for the display device according to the fifth example embodiment may include a frame member 21 disposed corresponding to the non-display area NA, and a protective member 25 disposed on the frame member 21 corresponding to the display area DA and the non-display area NA.

A fixed member 215 may be disposed at an edge of the frame member 21. The fixed member 215 may protrude from the edge of the frame member 21, and a hole 217 may be formed in a central portion of the fixed member 215.

The frame member 21 may be fixed to the display panel 10 or the housing 40 using the hole 217 formed in the fixed member 215.

Further, an auxiliary fixed member 255 having a shape similar to that of the fixed member 215 may be disposed at an edge of the protective member 25, and the cover window 20 may be fixed to the display panel 10 or the housing 40 using the fixed member 215 and the auxiliary fixed member 255.

The light blocking member 23 may be disposed between the frame member 21 and the protective member 25 corresponding to the non-display area NA.

Referring to illustration (a) of FIG. 12, a groove 235 may be formed in a top surface of the light blocking member 23 in a region where the frame member 21 and the protective member 25 are bent. Referring to illustration (a) of FIG. 12, the cover window 20 may be more easily bent by forming the groove 235 between the light blocking member 23 and the protective member 25.

Moreover, as shown in FIG. 13, a groove 237 may be formed in a bottom surface of the light blocking member 23 (refer to illustration (a) of FIG. 13) in a region where the frame member 21 and the protective member 25 are bent (refer to illustration (b) of FIG. 13).

Hereinafter, the cover window for a display device according to the sixth example embodiment will be described with reference to FIG. 14.

Figure 14:
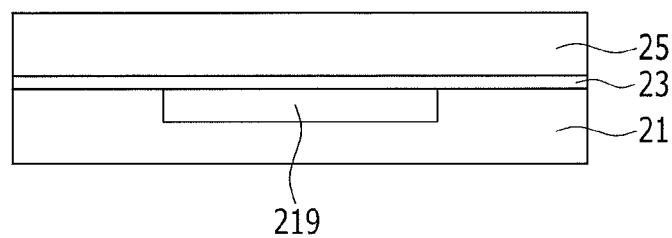
FIG. 14 illustrates a cross-sectional view of a curved portion of the cover window for a display device according to the sixth example embodiment.

FIG. 14 illustrates a cross-sectional view of a curved portion of the cover window for a display device according to the sixth example embodiment.

The cover window for a display device according to the sixth example embodiment is made of a flexible or foldable material.

As shown in FIG. 14, a groove 219 may be formed in at least a part of a top surface of the frame member 21 in a region where the frame member 21 and the protective member 25 are bent. The cover window 20 may be more easily bent by forming the groove 219 in the frame member 21.

The light blocking member 23 may be disposed between the frame member 21 and the protective member 25 to cover the groove 219.

Hereinafter, the cover window for a display device according to the seventh example embodiment will be described with reference to FIGS. 15 and 16.

Figure 15:
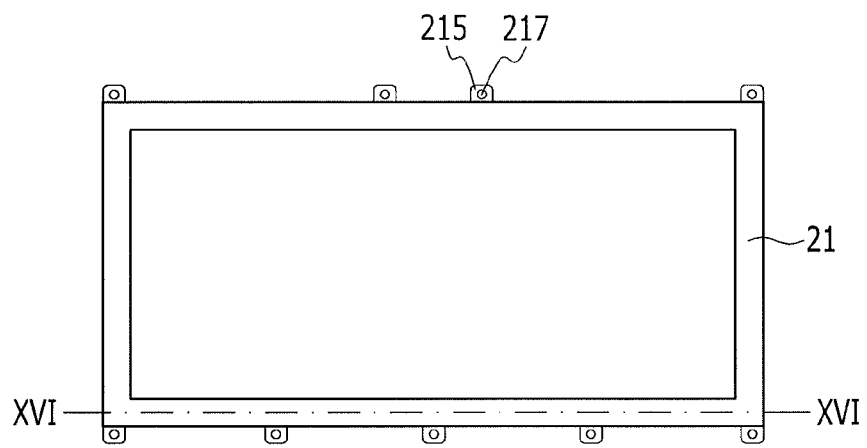
FIG. 15 illustrates a plan view of a cover window for a display device according to the seventh example embodiment.
Figure 16:
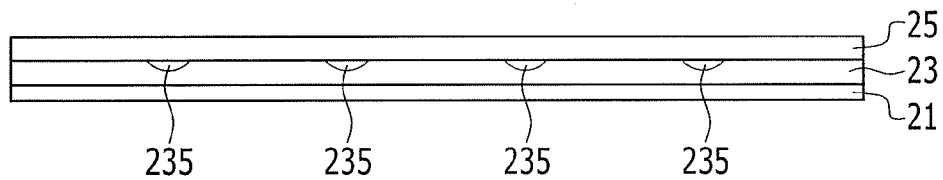
FIG. 16 illustrates a cross-sectional view of the cover window for a display device according to the seventh example embodiment taken along line XVI-XVI of FIG. 15.

FIG. 15 illustrates a plan view of a cover window for a display device according to the seventh example embodiment, and FIG. 16 illustrates a cross-sectional view of the cover window for a display device according to the seventh example embodiment taken along line XVI-XVI of FIG. 15.

The cover window for a display device according to the seventh example embodiment is made of a flexible or foldable material.

As shown in FIGS. 15 and 16, the cover window 20 for a display device according to the seventh example embodiment may include a frame member 21 disposed corresponding to a non-display area NA, and a protective member 25 disposed on the frame member 21 corresponding to a display area DA and the non-display area NA.

The fixed member 215 may be disposed at an edge of the frame member 21. The fixed member 215 may protrude from the edge of the frame member 21, and the hole 217 may be formed in a central portion of the fixed member 215. The frame member 21 and the protective member 25 may be bent at a plurality of points, and the fixed members 215 may be disposed in the plurality of points where the frame member 21 and the protective member 25 are bent, respectively.

The light blocking member 23 may be disposed corresponding to the non-display area NA between the frame member 21 and the protective member 25.

The groove 235 may be formed in a top surface of the light blocking member 23 in a region where the frame member 21 and the protective member 25 are bent. The frame member 21 and the protective member 25 may be bent at a plurality of points, and the grooves 235 may be formed in the plurality of points where the frame member 21 and the protective member 25 are bent, respectively. The cover window 20 may be more easily bent by forming the grooves 235 in the plurality of points where the frame member 21 and the protective member 25 are bent, respectively, between the light blocking member 23 and the protective member 25.

Further, although not shown, the groove 235 may be formed in a bottom surface of the light blocking member 23 in a region where the frame member 21 and the protective member 25 are bent.

By way of summation and review, in a display device used for the mobile device, a cover window may be transparently configured in a forward direction of a display panel so that a user may view a display unit. Since the cover window is provided at the outermost portion of a display device, the cover window is expected to be robust to external impact to protect a display panel inside the display device.

Further, instead of using a switch or a keyboard as an input device, a structure using a touch panel integrally formed with a display screen has been extensively supplied so that a surface of a cover window frequently makes contact with a finger. Accordingly, there is a need for a stronger structure.

In addition, a flexible display device is of interest. A cover window applied to a display device may be made of a foldable member having flexibility.

However, the strength and the flexibility of the cover window may have a trade-off relationship with each other, and it may be difficult to achieve both of the strength and the flexibility.

As described above, embodiments relates to a foldable cover window for a display device having surface hardness greater than a predetermined level, a display device including the same, and a method of manufacturing the cover window for the display device. Embodiments may provide a cover window for a display device, a display device including the same, and a method of manufacturing the cover window for the display device having advantages of being folded and having surface hardness higher than a predetermined level.

In a cover window for a display device, the display device including the same, and the method of manufacturing the cover window for the display device according to an example embodiment, the frame member may be disposed corresponding to a non-display area using a material having high hardness, and a protective member may be disposed on an entire region of the frame member using a transparent material. Thus, a foldable cover window having surface hardness higher than a predetermined level may be implemented.

In addition, after the protective member is provided on the frame member at a high temperature, tension may be generated between the protective member and the frame member during a cooling procedure, so the flatness and texture of a surface, and the surface hardness may be enhanced.

<Description of Symbols>

| | |
|---|---|
| 11: display area | 12: non-display area |
| 13: first substrate | 14: second substrate |
| 21: frame member | 23: light blocking member |
| 25: protective member | 27, 29: opening |
| 40: housing | 50: flexible printed circuit (FPC) |
| 52: extension unit | 100: display device |
| 211: transparent unit | 212: opaque unit |
| 215: fixed member | 217: hole |
| 219, 235, 237: groove | 251: first protective member |
| 252: second protective member | |

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope as set forth in the following claims.

What is claimed is:

1. A cover window for a display device that includes a display area and a non-display area, the cover window comprising:
    a frame member disposed corresponding to the non-display area, the frame member including an inorganic material and being opaque; and
    a protective member disposed on the frame member and corresponding to the display area and the non-display area, the frame member and the protective member overlapping each other in a lateral direction and being connected to one another, the protective member including a transparent material, a thermal expansion coefficient of the frame member being less than a thermal expansion coefficient of the protective member, the protective member being in tension in the lateral direction,
    wherein the protective member includes:
        a first protective member covering an upper surface and a side surface of the frame member, and
        a second protective member disposed on the first protective member.

2. The cover window as claimed in claim 1, wherein the frame member includes one or more of an inorganic metal, a metal alloy, a ceramic material, a carbon fiber, or a glass fiber.

3. The cover window as claimed in claim 1, wherein the frame member and the protective member are formed in a single layer or a multi-layer.

4. The cover window as claimed in claim 3, wherein the protective member includes:
    a first protective member disposed on a same layer with the frame member, the first protective member corresponding to the display area; and
    a second protective member disposed on the first protective member and the frame member.

5. The cover window as claimed in claim 4, wherein
    the first protective member is made of a transparent resin, and
    the second protective member is made of a silsesquioxane.

6. The cover window as claimed in claim 1, further comprising a light blocking member between the frame member and the protective member, the light blocking member corresponding to the non-display area.

7. The cover window as claimed in claim 1, further comprising an opening formed in the frame member and the protective member through a region corresponding to at least a part of the non-display area.

8. The cover window as claimed in claim 1, wherein at least a part of the frame member and at least a part of the protective member are bent.

9. The cover window as claimed in claim 8, wherein the cover window has a thickness less than about 100 µm.

10. The cover window as claimed in claim 8, further comprising a fixed member protruding from an edge of the frame member, wherein a hole is formed in a central portion of the fixed member.

11. The cover window as claimed in claim 10, further comprising an auxiliary fixed member protruding from an edge of the protective member, wherein a hole is formed in a central portion of the auxiliary fixed member.

12. The cover window as claimed in claim 11, wherein
the frame member and the protective member are bent at a plurality of points, and
auxiliary fixed members are disposed at the plurality of bent points, respectively.

13. The cover window as claimed in claim 8, further comprising a light blocking member disposed between the frame member and the protective member, the light blocking member corresponding to the non-display area, wherein a groove is formed in at least a part of a top surface or a bottom surface of the light blocking member, the groove being formed in a region where the frame member and the protective member are bent.

14. The cover window as claimed in claim 13, wherein
the frame member and the protective member are bent at a plurality of points, and
the grooves are formed at the plurality of bent points, respectively.

15. The cover window as claimed in claim 8, further comprising:
a groove formed in at least a part of a top surface of the frame member, the groove being formed in a region where the frame member and the protective member are bent; and
a light blocking member disposed between the frame member and the protective member to cover the groove.

16. A method of manufacturing a cover window for a display device that includes a display area and a non-display area, the method comprising:
providing a frame member corresponding to the non-display area, the frame member including an inorganic material and being opaque;
disposing a protective member on the frame member and corresponding to the display area and the non-display area, the protective member including a transparent material, a thermal expansion coefficient of the frame member being less than a thermal expansion coefficient of the protective member, the disposing of the protective member being performed at a temperature greater than a room temperature; and
cooling the cover window to the room temperature after disposing the protective member, the protective member being in tension in the lateral direction after cooling the cover window,
wherein the protective member includes:
a first protective member covering an upper surface and a side surface of the frame member, and
a second protective member disposed on the first protective member.

17. The method as claimed in claim 16, wherein disposing the protective member on the frame member includes:
disposing the first protective member by coating a transparent resin on the frame member; and
disposing the second protective member on the first protective member using a silsesquioxane.

18. The method as claimed in claim 17, wherein:
the disposing of the protective member is performed at the temperature greater than the room temperature, and
the cooling of the cover window is performed after disposing the second protective member.

19. The method as claimed in claim 18, wherein the disposing of the protective member is performed at a temperature greater than a use temperature range of the display device.

* * * * *